US012600056B2

(12) United States Patent
Klaas

(10) Patent No.: US 12,600,056 B2
(45) Date of Patent: Apr. 14, 2026

(54) COMBINED PROCESS OF HYDROLYSIS AND ESTERIFICATION OF WOOD

(71) Applicant: Peter Klaas, Martofte (DK)

(72) Inventor: Peter Klaas, Martofte (DK)

( * ) Notice: Subject to any disclaimer, the term of this patent is extended or adjusted under 35 U.S.C. 154(b) by 0 days.

(21) Appl. No.: 18/283,845

(22) PCT Filed: Mar. 25, 2022

(86) PCT No.: PCT/DK2022/050060
§ 371 (c)(1),
(2) Date: Sep. 25, 2023

(87) PCT Pub. No.: WO2022/199774
PCT Pub. Date: Sep. 29, 2022

(65) Prior Publication Data

US 2024/0246256 A1 Jul. 25, 2024

(30) Foreign Application Priority Data

Mar. 25, 2021 (DK) ........................... PA 2021 70141

(51) Int. Cl.
*B27K 3/15* (2006.01)
*B27K 3/02* (2006.01)
*B27K 5/00* (2006.01)

(52) U.S. Cl.
CPC ............ *B27K 3/156* (2013.01); *B27K 3/0292* (2013.01); *B27K 5/001* (2013.01); *B27K 5/0075* (2013.01); *B27K 2240/20* (2013.01)

(58) Field of Classification Search
CPC ...... B27K 3/156; B27K 3/0292; B27K 5/001; B27K 5/0075; B27K 2240/20; B27K 5/007
See application file for complete search history.

(56) References Cited

U.S. PATENT DOCUMENTS

| | | | | |
|---|---|---|---|---|
| 4,377,040 | A | 3/1983 | Glebeler et al. | |
| 4,615,737 | A | 10/1986 | Kiisler et al. | |
| 2004/0258941 | A1 | 12/2004 | Neogi et al. | |
| 2008/0223360 | A1 * | 9/2008 | Kingma | F26B 21/08 127/65 |
| 2010/0003411 | A1 | 1/2010 | Güthner et al. | |
| 2018/0009126 | A1 | 1/2018 | Holm et al. | |
| 2018/0015636 | A1 | 1/2018 | Klaas | |

FOREIGN PATENT DOCUMENTS

| | | | | |
|---|---|---|---|---|
| CN | 102320069 | A | 1/2012 | |
| CN | 103433988 | A | 12/2013 | |
| CN | 111070357 | A * | 4/2020 | B27K 3/08 |
| DK | 179238 | B1 | 2/2018 | |
| EP | 0 626 240 | B1 | 2/1998 | |
| EP | 2196295 | A1 | 6/2010 | |
| EP | 2 485 880 | A1 | 8/2012 | |
| EP | 2485800 | A1 | 8/2012 | |
| EP | 3272479 | A1 | 1/2018 | |
| EP | 4190520 | A1 | 6/2023 | |
| EP | 4313527 | A1 | 2/2024 | |
| JP | 2013180460 | A | 9/2013 | |
| NO | 20220732 | A1 | 12/2023 | |
| WO | 96/24472 | A1 | 8/1996 | |
| WO | 01/24982 | A1 | 4/2001 | |
| WO | 2006/121352 | A1 | 11/2006 | |
| WO | 2006/125797 | A1 | 11/2006 | |
| WO | 2009095687 | A1 | 8/2009 | |
| WO | 2011/007043 | A1 | 1/2011 | |
| WO | 2011044179 | A1 | 4/2011 | |
| WO | WO-2011144608 | A1 * | 11/2011 | B27K 3/156 |
| WO | 2022/199774 | A1 | 9/2022 | |

OTHER PUBLICATIONS

International Search Report for PCT/DK2022/050060 mailed on Jun. 7, 2022.
Danish Search Report for PA 2021 70141 mailed on Aug. 20, 2021.
Danish Search Report for PA 2024 30549 dated Mar. 13, 2025.
Danish Search Report for PA 2025 30356 dated Oct. 9, 2025.
Danish Search Report for PA 2025 30356 dated Aug. 22, 2025.
Hill, C. (2006): "Wood Modification—Chemical, Thermal and Other Processes". Wiley & Sons Ltd., West Sussex.
Jones & Sandberg (2020): A review of Wood Modification Globally—Updated Findings from Cost FP1407. Interdisciplinary Perspectives on the Built Environment. Lubineau, A., Journal of Organic Chemistry, 1986 (51), 2142.
Thybring, E. (2013): "Review: The decay resistance of modified wood influenced by moisture exclusion and swelling reduction". International Biodeterioration & Biodegradation 82:87-95.
Sandberg, D., Kutnar, A., Karlsson, O. and Jones, D.: "Wood modification technologies—principles, sustainability and the need for innovation". CRC Press, Boca Raton, 2021. Suib, S.: "New and future developments in catalysis". Elsevier, Amsterdam, 2013.
Suib, S.: "New and future developments in catalysis". Elsevier, Amsterdam, 2013.
Zelinka, S., Altgen, M., Emmerich, L., Guigo, N., Keplinger, T., Kymäläinen, M., Thybring, e., and Thygesen, L.: Review of Wood Modification and Wood Functionalization Technologies. Forests (2022), 13, 1004.
Sandberg, D., Kuntnar, A. and Mantanis, G.: "Wood modification technologies—A review". Forest 10: 895-908 (2017).
International Search Report for PCT/DK2023/050173 mailed Sep. 14, 2023.

(Continued)

*Primary Examiner* — Alexander M Weddle
(74) *Attorney, Agent, or Firm* — Schmeiser, Olsen & Watts, LLP

(57) ABSTRACT

A method of treating a cellulose-based material, for example wood and engineered wood is provided, wherein the process involves the following steps: selecting and placing the cellulose-based material in a treatment chamber; impregnating the cellulose-based material with an impregnating agent consisting of an aqueous solution comprising a fluid suitable for esterification; facilitating a hydrolysis process whereby the impregnating agent reacts resulting in the formation of esters and polyesters inside the cellulosed-based material.

19 Claims, No Drawings

(56) References Cited

OTHER PUBLICATIONS

Written Opinion for PCT/DK2023/050173 mailed Sep. 14, 2023.
Acosta, A., Beltrame, R., Missio, A., Amico, S., Delucis, R and Gatto, D. (2022): "Furfurylation as a post-treatment for thermally-treated wood". Biomass Conversion and Biorefinery, Springer online.
Rowell, R. (1983): "Chemical modification of wood"; Forest Products Abstracts 6(12), 363-382.
Thybring, E., Digaitis, R., Nord-Larsen, T., Beck, G. and Fredriksson, M. (2020): "How much water can wood cell walls hold? A triangulation approach to determine the maximum cell wall moisture content". PLoS One, 15(8): e0238319.
Xie, Krause & Millitz (2008): "Modification of Wood with N-Methylol Resisns", in Schultz et al.: 30 "Development of Commercial Wood Preservatives", Chapter 21. ACS Symposium Series; American Chemical Society: New York.
Lubineau, A., Journal of Organic Chemistry, 1986 (51), 2142.
International Search Report for PCT/DK2025/050165 mailed on Nov. 26, 2025.
Written Opinion for PCT/DK2025/050165 mailed on Nov. 26, 2025.

* cited by examiner

COMBINED PROCESS OF HYDROLYSIS AND ESTERIFICATION OF WOOD

CROSS-REFERENCE TO RELATED APPLICATIONS

This application claims priority to PCT Application No. PCT/EP2022/050060, having a filing date of Mar. 25, 2022, which is based DK Application No. PA 2021 70141, having a filing date of Mar. 25, 2021, the entire contents both of which are hereby incorporated by reference.

FIELD OF TECHNOLOGY

The following is directed to a novel and inventive method of improving and preserving cellulose-based materials, in particular wood, such that the wood exhibits improved durability characteristics after the treatment. The treated wood may be used in aggressive environments, and be treated at substantially lower cost for non-biocidal modification than what is known in the conventional art.

BACKGROUND

Various modification methods have been developed in order to improve the durability characteristics of wood. In this connection it is desirable to improve the wood's ability to resist attacks by fungus, bacteria, insects etc. Durability over the long term is an issue for many wood species if protection against fungal and insect attack is not addressed, typically through chemical impregnation. Chemical preservative treatments will of course enhance the low natural durability of any species.

Consumer and contract law require that any product offered for sale must be fit for its intended use and a wood product impregnated with preservative is no exception.

In this standard, the level of treatment is tailored to the application 'Use Class' (UC) of a wood product as defined in *European standard EN* 335 (*Durability of wood and wood-based products*).

The Use Classes are defined in the Standard EN 335-1 Definitions of Use Classes as shown below:

UC 1—Internal, dry—for example upper floor joists

UC 2—Internal, risk of wetting—for example tile battens

UC 3.1—Outdoors, coated, above ground—for example window frames

UC 3.2—Outdoors, uncoated, above ground—for example fence rails

UC 4—Direct soil or fresh water contact—for example fence posts

UC 5—Marine use—for example marine pilings

Obviously, there is a desire to improve the wood characteristics, such that wood may be given a higher UC rating and thereby achieve a higher price.

Embodiments of the present invention are especially directed at improving the characteristics of wood such that inferior wood may be given a higher UC (use class)

Esters are derived from carboxylic acids, where the hydrogen in its carboxylic group is replaced by a hydrocarbon group of some kind. This group may be provided from components of the wood cell structure itself such as hemi celluloses or celluloses ("wood esterification", Hill (2011)), or from an added reactant ("esterification based bulk impregnation", Hill (2011)) such as sorbitol, glycerol, furfuryl alcohol or DMDHEU.

Dimethylol ethyleneurea (DMDHEU) is an organic compound derived from formaldehyde and urea. It is a colorless solid that is used for treating cellulose-based heavy fabrics to inhibit wrinkle formation. Dimethylol ethylene urea (DMEU) bonds with the hydroxyl groups present in long cellulose chains and prevents the formation of hydrogen bonding between the chains, the primary cause of wrinkling. This treatment produces permanently wrinkle-resistant fabrics and is different from the effects achieved from using fabric softeners.

Esterification is a convenient method for wood surface modification due to the high amount of free hydroxyl groups available in the wood structure. By use of different esterification approaches, improved dimensional stability, improved durability and resistance to fungal degradation, termite resistance, higher fire resistance and improved mechanical durability was obtained. For a review of these approaches, see also Teacä & Tanasa (2020).

The different approaches involve the following general process:

$$RCO_2H + R'OH \leftrightarrow RCO_2HR' + H_2O \xrightarrow[Polymerisation]{} \text{Polyesters} \quad (1)$$

a) impregnation of the wood with an aqueous solution of a carboxylic acid (including alcohols which can act as a weak organic acid; the solution main involves other agents and catalysts depending on the specific approach)

b) drying of the impregnated wood at lower temperatures to reduce moisture content, and c) curing of the impregnated wood at elevated temperatures to ensure sufficient esterification.

Hydrolysis of wood (or wood fibers) is a widely used process for breaking down wood into residual components of commercial value, such as biofuel. In the process, the simple sugars are further broken down into Furan and organic acids, mainly acetic acid, as well as other substances.

Thus, for example, the hydrolysis of hemicelluloses in the case of Xyloses/Arabinoses proceeds as follows in (2) below:

$$(C_5H_{10}O_5)_n \xleftrightarrow[H_2O]{} C_5H_{10}O_5 \xrightarrow[RCO_2H]{} RCO_2H + C_4H_4O \quad (2)$$

The main advantage of esterification is that it (in many cases) offers good performance in UC 3, 4 and UC 5 applications, is resistant to termites and offers improved fire retardancy and mass increase properties. The drawback of esterification is that it is a complicated process which causes high product costs, making it less competitive in the market. The reason for this is both high capital and operational expenditures for the industrial process, which is complicated and lengthy.

Thus, if a hydrolysis process could be combined with a simple esterification process, the combined system can produce both lower cost UC 3 purpose products, as well as heavy duty UC 4,5 purpose.

It is well established that the hydrolysis process produces carboxylic (organic) acids as an end product, primarily Acetic acid, in accordance with (2). The formation of such acids can then be utilized in a combined hydrolysis and esterification process.

Embodiments of the present invention are to achieve improved characteristics by utilizing parts of different technologies and take advantage of the chemical properties of the processes.

Embodiments of the invention achieve this by providing a method of treating a cellulose-based material, for example wood and engineered wood, wherein the process involves the following steps:

- Selecting and placing the cellulose-based material in a treatment chamber;
- Impregnating the cellulose-based material with an impregnating agent consisting of an aqueous solution comprising a fluid suitable for esterification;
- Facilitating a hydrolysis process whereby the impregnating agent reacts resulting in the formation of esters and polyesters inside the cellulosed-based material.

Consequently, the idea behind embodiments of the invention is as follows: instead of impregnating the wood with an organic acid according to the first step a) above for esterification, the organic acids produced by the thermal modification process in (2) can substitute this and act as reactant.

All species of wood may benefit from this treatment but particularly spruce, fir, pine, beech, oak, birch and ash, as well as all types of engineered wood such as veneers, glue laminated timber and cross laminated timer, exhibit improved characteristics after having been treated.

Instead, to achieve an efficient and strong esterification of the wood, it suffices to impregnate the wood before hydrolysis and further with a second reactant as mentioned in the general process above under (1), for example sorbitol, glycerol, xylitol, Furfurylalchol or DMEHEU. The combination of esterification process (1) and hydrolysis process (2) then yields the following general process:

$$(C_5H_{10}O_5)_n \xleftrightarrow[H_2O]{} C_5H_{10}O_5 \xrightarrow[RCO_2H]{} \qquad (3)$$

$$RCO_2H + R'OH \leftrightarrow RCO_2HR' + H_2O \xrightarrow[Polymerisation]{} \text{Polyesters}$$

This new process involves the following steps:

A) Impregnation with aqueous solution of a relevant agent which lends itself well to esterification by providing the needed hydrocarbon group according to (1) above. Examples of relevant agents may be for example sorbitol, glycerol, DMDHEU, Furfurylalcohol or xylitol. Depending on the exact circumstances, the impregnation process can be performed as either a Full Cell or Empty Cell impregnation process. In most cases the process is performed at ambient temperature, although for specific agents elevated temperature of the aqueous solution of 40-70 degrees may be advantageous. For vacuum phase, pressure down to 0.1 Bar(A) may be applied, while for the pressure phase pressure up to 15 Bar(A) may be applied.

C) Hydrolysis of the wood whereby the organic acids produced by the hydrolysis reacts with the reactant impregnated into the wood in step A, resulting in the formation of esters and polyesters. Depending on the particular monomer and the particular product, Pressure is elevated to 5-20 Bar(A) and temperature to 100-175° C., which are kept during a holding phase lasting between 30 minutes and 12 hours, before cooling down again to ambient temperature.

The holding phase is important at this stage Due to potential uneven temperature distribution, the holding phase will ensure an even temperature across the cellulose-based material being treated. Furthermore, as the hydrolysis and polymerization occur during this period, it is important to maintain the holding phase for long enough time, to assure that the desired level of polymerization and hydrolysis has had enough reaction time. In this manner it is assured that a homogeneous result is achieved. Once the desired level of polymerization and hydrolysis has been achieved the temperature and pressure may be reduced to ambient conditions. The desired level will typically be 100% or as close to 100% as possible.

The main advantage is that softwood can be used for applications that require high durability, which might be seen as environmentally friendly. Durability class 1-3, according to European Standard EN 350-2, can be obtained out of non-durable (class 5) softwood species.

The biological resistance against some (not all) microorganisms and insects is improved. Shrinking and swelling is reduced up to 50-90% The treated wood is somewhat darkened in color.

As a principle the treatment process can be done on all wood species.

As an optional step it may in some embodiments, particularly depending on the type of wood being treated be advantageous to dry the impregnated wood down to a level which allows for thermal modification. In this context this means drying, such that the water content in the impregnated cellulose-based material is between from 0 wt % to 20 wt % water. Typically, this drying step will be performed prior to hydrolysis.

AN EXAMPLE OF A COMBINED HYDROLYSIS AND FURFURYLAZATION PROCESS

This process can be done in different ways. In particular, it can be done in either a one step or a two-step process.

In the one step process, furfurylalcohol (FA) is vaporized within the chamber used for the hydrolysis process, so that the vaporized FA penetrates the wood cells simultaneously with the hydrolysis process.

In the two-step process, wood is first impregnated with an aqueous solution of FA in the first step. In the second step, the impregnated wood is hydrolyzed, and FA is polymerized simultaneously.

One step process.

First, the selected wood is arranged inside the chamber suitable for hydrolysis. The chamber can be heated, cooled and pressurized. In the bottom of the chamber, an aqueous solution of FA is placed in an open container, which can be heated to a point where FA evaporates.

Second, a vacuum of 0.2 Bar(A) for 30 min. is established, in order to empty the cells for atmospheric air and make room for FA vapor.

Third, the chamber is pressurized to 15 Bar(A)

Fourth, the chamber is heated to 150 deg. C. During the heating, the FA is heated until it evaporates, and is then circulated around the wood inside the chamber. Due to the high pressure, the FA vapors penetrate the empty wood cells.

Steps three and four can be combined in one step where pressure and heat are increased simultaneously. The preceding steps constitutes the impregnation process.

When the wood temperature reaches the desired temperature of 150 deg. C., the pressure and temperature is kept stable for two hours in a holding phase. During this phase, wood hemicelluloses is hydrolyzed into carboxylic acids and other residuals. Simultaneously, the vaporized FA inside the wood cells react with the carboxylic acids produced by the hydrolysis, resulting in the polymerization of the FA into a furan polymer.

The combined hydrolysis of hemicelluloses and furan polymer in the wood cells, results in increased durability against rot and fungi, increased dimensional stability and a number of other positive effects on the wood.

Fifth, the chamber is cooled down to ambient temperature, and

Sixth, the pressure on the chamber is brought down to atmospheric pressure, after which the chamber can be opened, and the modified wood taken out.

Two-Step Process

First Step—Impregnation

First, the selected wood is placed in a chamber suitable for vacuum and pressure impregnation with aqueous solutions, and the door is closed and sealed.

The impregnation process can be in two different ways:

Example with full cells, meaning that a lower initial pressure is present, such that as the method progresses air is injected into the cells before the impregnating fluid is introduced and forced not the wood. When the pressure is lowered again (till normal atmospheric pressure) the trapped air will create a kick-back, forcing some of the fluid out again. In this manner impregnating fluid may be saved, without compromising the impregnation.

First, pressure in the chamber is elevated to 5 bar(A).

Second, the chamber is filled with the FA solution.

Third, pressure in the chamber is elevated to 15 bar(A).

Fourth, the pressure is kept for 2 hours, or until full uptake of the FA fluid is achieved.

Fifth, the chamber is emptied for FA fluid.

Sixth, a vacuum of 0.2 Bar(A) is established and maintained for 1 hour.

Example with empty cells, meaning that a pre-vacuum is established in order to extract any air from the cells of the wood. This is followed by forcing the impregnation fluid into the now empty cells.

First, a vacuum of 0.2 Bar(A) is established in the chamber.

Second, the chamber is filled with the FA solution.

Third, the pressure in the chamber is elevated to 15 Bar(A).

Fourth, the pressure is kept for 2 hours, or until full uptake of the FA fluid is achieved.

Fifth, the chamber is emptied for FA fluid.

Sixth, a vacuum of 0.2 Bar(A) is pulled and maintained for 1 hour.

Second Step—Hydrolysis and Polymerization

First, the selected wood is put inside the chamber suitable for hydrolysis. The chamber can be heated, cooled and pressurized. The door is closed and sealed.

Second, the pressure in the chamber is elevated to 15 Bar(A).

Third, the temperature is elevated to 150 deg. C.

Steps two and three can be combined in one step.

Fourth, when the wood temperature reaches the desired temperature of 150 deg. C., the pressure and temperature is kept stable for two hours in a holding phase. During this phase, wood hemicelluloses is hydrolyzed into carboxylic acids and other residuals. Simultaneously, the aqueous solution of FA inside the wood cells reacts with the carboxylic acids produced by the hydrolysis, resulting in the polymerization of the FA into a furan polymer.

The combined hydrolysis of hemicelluloses and furan polymer in the wood cells, results in increased durability against rot and fungi, increased dimensional stability and a number of other positive effects on the wood.

Fifth, the temperature in the chamber is brought down to ambient temperature, and Sixth, the pressure in the chamber is brought down to atmospheric pressure, after which the door can be opened, and the wood taken out.

The process/method according to embodiments of the invention are technically less complicated and commercially less costly for producing esterification-based type of products for heavy duty applications, compared to the traditional approaches mentioned above.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements. The mention of a “unit” or a “module” does not preclude the use of more than one unit or module.

The invention claimed is:

1. A method of treating wood or engineered wood, comprising: step 1, step 2, and step 3, wherein step 1 includes either substeps 1a) through 1c) or substeps 1aa) through 1dd), wherein substeps 1a) through 1c) include:

1a) selecting and placing the wood or engineered wood in hydrolysis chamber that can be heated, cooled, and pressurized;

1b) applying a vacuum to the hydrolysis chamber in order to empty cells of the wood or engineered wood; and 1c) providing an aqueous impregnation solution comprising an impregnation agent suitable for esterification in the hydrolysis chamber, pressurizing the hydrolysis chamber, and heating the hydrolysis chamber sufficiently to evaporate the aqueous impregnation solution, wherein the evaporated aqueous impregnation solution penetrates the cells of the wood or engineered wood and impregnates the wood or engineered wood;

and wherein substeps 1aa) through 1dd) include:

1aa) selecting and placing the wood or engineered wood in a vacuum/pressure chamber;

1bb) providing an aqueous impregnation solution comprising an impregnation agent suitable for esterification and pressuring the vacuum/pressure chamber, wherein the aqueous impregnation solution impregnates the wood or engineered wood by either full cell impregnation or empty cell impregnation;

1cc) transferring the impregnated wood or engineered wood to the hydrolysis chamber; and 1dd) pressurizing and heating the hydrolysis chamber containing the impregnated wood or engineered wood;

wherein step 2 includes maintaining pressure and heat in the hydrolysis chamber for a holding phase, wherein during the holding phase hemicelluloses of the impregnated wood or engineered wood are hydrolyzed to produce carboxylic acids, while simultaneously, the impregnation agent suitable for esterification in the impregnated wood or engineered reacts with the produced carboxylic acids, resulting in polymerization of the impregnation agent suitable for esterification to form a polymerized wood or engineered wood product; and wherein step 3 includes lowering the temperature to ambient temperature and lowering the pressure in the hydrolysis chamber to atmospheric pressure;

wherein the method does not include a drying step wherein the impregnated wood or engineered wood is dried to a level allowing thermal modification between impregnation and hydrolysis during the holding phase.

2. The method according to claim 1, wherein the wood or engineered wood is spruce, fir, pine, beech, oak, birch, and/or ash.

3. The method according to claim 1, wherein the impregnation agent suitable for esterification is selected from sorbitol, glycerol, furfuryl alcohol, or xylitol.

4. The method according to claim 1, wherein the impregnation agent suitable for esterification is dimethylol ethyleneurea.

5. The method according to claim 1, wherein the general chemical process for hydrolysis of hemicelluloses of the impregnated wood or engineered wood to produce carboxylic acids and simultaneous reaction of the impregnation agent suitable for esterification in the impregnated wood or engineered wood with the produced carboxylic acids is:

$$(C_5H_{10}O_5) \underset{H_2O}{\longleftrightarrow} C_5H_{10}O_5 \xrightarrow[RCO_2H]{} RCO_2H + R'OH \leftrightarrow RCO_2H\,R' + H_2O \xrightarrow[Polymerisation]{} \text{Polyesters}. \quad (3)$$

6. The method according to claim 1, wherein the pressure during the holding phase is between 5 and 20 Bar (A).

7. A wood treated according to the method according to claim 1.

8. The method according to claim 1, wherein impregnation comprises a pressure phase with a pressure of 15 Bar (a).

9. A method of creating a polymerized wood or engineered wood product, comprising:

providing wood or engineered wood;

impregnating the wood or engineered wood with an impregnation agent to form an impregnated wood or engineered wood, wherein the impregnation agent is suitable for esterification;

providing the impregnated wood or engineered wood in a hydrolysis chamber;

pressurizing the hydrolysis chamber to between 5 and 20 Bar (A) and heating the hydrolysis chamber to between 10° and 175° C. for between 30 minutes and 12 hours, during which hemicelluloses of the impregnated wood or engineered wood are hydrolyzed to produce carboxylic acids, while substantially simultaneously, the impregnation agent in the impregnated wood or engineered reacts with the produced carboxylic acids, resulting in polymerization of the impregnation agent suitable for esterification to form the polymerized wood or engineered wood product.

10. The method of claim 9, wherein the method does not include a drying step wherein the impregnated wood or engineered wood is dried to a level allowing thermal modification between impregnation and hydrolysis.

11. The method of claim 9, wherein impregnating the wood or engineered wood occurs in the hydrolysis chamber.

12. The method of claim 9, wherein impregnating the wood or engineered wood occurs in a separate chamber.

13. The method of claim 9, wherein the impregnation agent comprises furfuryl alcohol.

14. The method of claim 9, wherein impregnating the wood or engineered wood comprises providing the wood or engineered wood in a vacuum/pressure chamber, pressurizing the vacuum/pressure chamber, providing an impregnation solution comprising the impregnation agent in the vacuum/pressure chamber, further pressurizing the vacuum/pressure chamber and maintaining the vacuum/pressure chamber in a further pressurized state, removing any excess impregnation solution, and applying a vacuum to the vacuum/pressure chamber.

15. The method of claim 9, wherein impregnating the wood or engineered wood comprises providing the wood or engineered wood in a vacuum/pressure chamber, applying a first vacuum to the vacuum/pressure chamber, providing an impregnation solution comprising the impregnation agent in the vacuum/pressure chamber, pressurizing the vacuum/pressure chamber and maintaining the vacuum/pressure chamber in a pressurized state, removing any excess impregnation solution, and applying a second vacuum to the vacuum/pressure chamber.

16. The method of claim 9, wherein the wood or engineered wood is spruce, fir, pine, beech, oak, birch, and/or ash.

17. The method of claim 9, wherein the impregnation agent suitable for esterification is selected from sorbitol, glycerol, furfuryl alcohol, or xylitol.

18. The method of claim 9, wherein the impregnation agent suitable for esterification is dimethylol ethyleneurea.

19. The method of claim 9, wherein the general chemical process for the hydrolysis of hemicelluloses of the impregnated wood or engineered wood to produce carboxylic acids and simultaneous reaction of the impregnation agent in the impregnated wood or engineered wood with the produced carboxylic acids is:

$$(C_5H_{10}O_5)_n \underset{H_2O}{\longleftrightarrow} C_5H_{10}O_5 \xrightarrow[RCO_2H]{} RCO_2H + R'OH \leftrightarrow RCO_2HR' + H_2O \xrightarrow[Polymerization]{} \text{Polyesters}. \quad (3)$$

* * * * *